W. SONNBERG.
BALL BEARING.
APPLICATION FILED JULY 31, 1906.
970,132.
Patented Sept. 13, 1910.
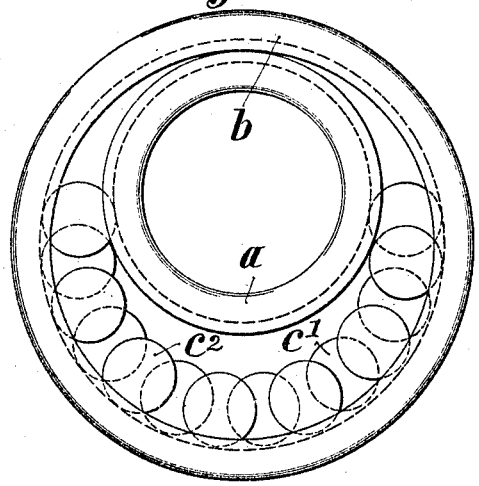
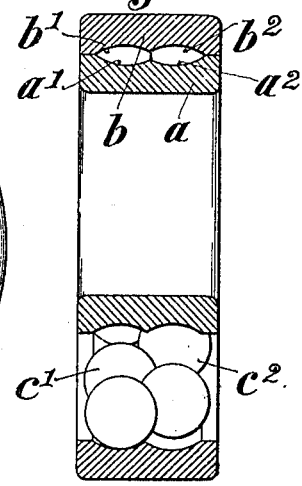
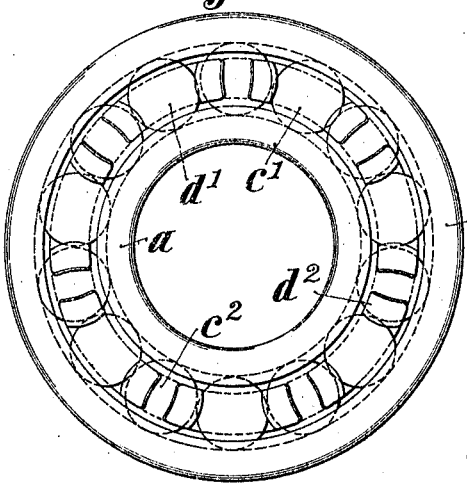
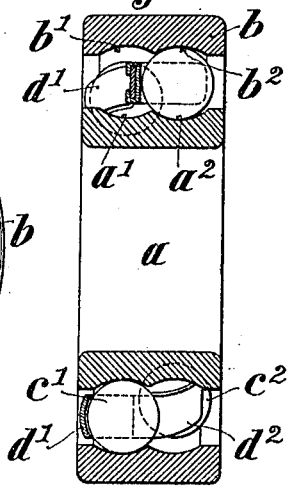
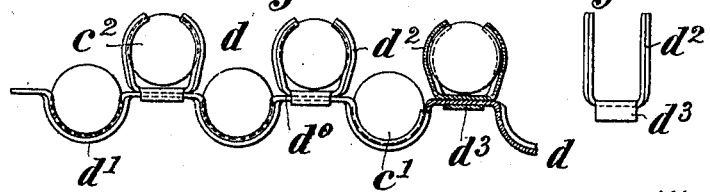
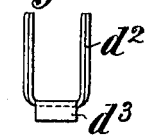
WITNESSES:
Fred White
René Bruine
INVENTOR:
Wilhelm Sonnberg,
By Attorneys, ic
UNITED STATES PATENT OFFICE.

WILHELM SONNBERG, OF BERLIN, GERMANY, ASSIGNOR TO DEUTSCHE WAFFEN-UND MUNITIONSFABRIKEN, OF BERLIN, GERMANY.

BALL-BEARING.

970,132.   Specification of Letters Patent.   Patented Sept. 13, 1910.

Application filed July 31, 1908. Serial No. 446,271.

*To all whom it may concern:*

Be it known that I, WILHELM SONNBERG, a subject of the King of Prussia, residing at 43/44 Dorotheenstrasse, Berlin, in the Kingdom of Prussia, Germany, have invented certain new and useful Improvements Relating to Ball-Bearings, of which the following is a full, clear, and exact description.

The present invention relates to the construction of ball bearings having two or more rows or sets of balls and the object of the invention is to manufacture said bearings without any openings for inserting the balls and in which in order to construct a very narrow bearing, the rows or sets of balls or the grooves or ball races are abnormally near to each other. Thus as the ball races are arranged very close together, it is possible for example when arranging two rows or sets of balls, to construct a very narrow bearing which is but very slightly broader than a bearing with only one row or set of balls and which nevertheless contains a much greater number of balls for example about one and a half times as many. This new method, which renders it possible to construct these narrow ball bearings with two or more rows or sets of balls and without any filling opening for inserting the balls into the bearing consists in this that by restricting the number of balls, the balls are inserted into the grooves or ball races which are arranged side by side and considerably nearer to each other than is usually the case and between the rotary or race rings which are arranged eccentrically so that the balls are arranged in a staggered or intermediate relation, the balls being inserted one after another and with equidistant distribution of the balls of the one row or set in the spaces between the balls of the other row or set. It is thus clear that inasmuch as the working grooves or ball races are nearer to each other than is usual and the balls have to be inserted so that they are arranged in staggered relation, the number of balls contained in each row or set must be somewhat less than the number of balls contained in a ball bearing of corresponding dimensions and containing only one row or set of balls. In any case however, as already mentioned, the ball bearing with two rows or sets of balls contains a considerably greater number of balls than a single row bearing not provided with a filling opening without, however, being much broader. Thus a ball bearing with two rows or sets of balls constructed according to the above mentioned method can easily be applied in various situations in place of a single row bearing, and will have a considerably greater supporting capacity resulting from the greater number of balls employed.

One manner of carrying out the present invention for manufacturing narrow ball bearings with two or more rows or sets of balls and without any filling opening for inserting the balls into the bearing is shown in the accompanying drawing in which:

Figure 1 is an elevation of a ball bearing constructed according to the present invention. Fig. 2 is a vertical transverse section thereof. Fig. 1$^a$ is a similar view to Fig. 1 the race rings being arranged eccentrically to permit of the insertion of the balls. Fig. 2$^a$ is a vertical transverse section thereof. Fig. 3 is a development of part of the cage separately showing the balls in position and Fig. 4 is an elevation of one of the stirrups separately.

The bearing illustrated is provided with two rows or sets of balls and consequently the rings $a$ $b$ are each provided with two grooves $a^1$, $a^2$ and $b^1$, $b^2$ whose centers are situated at about the half or slightly more of the diameter of the ball, from each other; whereas in the case of the ordinary bearing these centers must be situated more than the whole diameter of the ball from each other.

Figs. 1$^a$ and 2$^a$ show the method of inserting the balls in such a bearing with grooves or races approached very closely together. First the rings are arranged eccentrically to each other so that they touch at the top or at the bottom with their peripheries; then the row or set $c^1$ of balls in respect of the outer or left hand grooves or races $a^1$, $b^1$ are inserted so that the end ball only rests against the walls of the grooves or races in the angle of the half moon shaped space thus formed, whereas the other balls of the row or set are distributed equidistantly leaving spaces between them. Then the balls of the second row or set $c^2$ are placed against the balls of the first row $c^1$ so that they are situated in the spaces or gaps between the balls of the first row or set and its end ball rests on the walls of the grooves or races in the other angle of the half moon shaped space as may be more particularly seen in Fig. 1$^a$.

In the present case with a bearing of the dimensions shown it is possible to insert seven balls in each groove or race the end ball of the outer row or set $c^1$ is situated in the right hand angle of the half moon shaped space and the end ball of the inner row or set $c^2$ rests in the left hand angle of the half moon space, while the other balls are situated in staggered or intermediate relation to one another. The rings are then again arranged concentrically and the balls distributed at equal distances from each other so that by using a suitable cage $d$ maintaining the balls constantly in the desired relation, the bearing illustrated in Figs. 1 and 2 is obtained.

This bearing thus shows altogether fourteen balls, the gaps between the balls of the one row or set forming the spaces for the balls of the other row or set.

This bearing is but very slightly broader than a bearing with only one row or set of balls which without any filling opening under the most favorable circumstances can receive nine balls.

Furthermore this invention relates to the construction of a simple cage for ball bearings of the character hereinbefore described without filling opening and with two or more rows or sets of balls in which the balls of the one row or set are arranged in staggered or intermediate relation to those of the other row or set.

Up to the present time with ball bearings of this kind a cage in the form of a more or less undulated strip and situated between the rows or sets of balls was arranged so as to serve for both rows of balls and by means of recesses, holes or the like maintained the balls in their position on both sides.

The new cage differs essentially from this and this essential difference is the result of its application to a new kind of bearing, in which, owing to the eccentric insertion, the number of the balls is restricted and consequently the various balls are situated at a greater distance apart.

With bearings of this kind the cages mentioned above are inapplicable but of necessity another kind of cage is required which insures the correct distancing of the balls which are situated farther apart from each other and which cannot be introduced at the same time with the balls but only after all the balls have been inserted and distributed at equal distances from each other. Corresponding to this arrangement of the balls the cage illustrated more particularly in detail in Figs. 3 and 4, consists of a ring $d$ provided with recesses or pockets $d^1$ on one side for one set of balls and with fork-like projecting plates $d^2$ on the other side arranged between the recesses $d^1$ and fixed to the corresponding intermediary bridge part $d^0$. These forks or plates may either be formed integral with the intermediary bridge parts or, as shown in the drawing, may be fastened to the bridge parts by means of clips $d^3$. The recesses $d^1$ are for the purpose of receiving the balls $c^1$ of the first row or set, whereas the balls $c^2$ of the second row or set are inserted between the arms or prongs of the forks $d^2$ and after being inserted are securely held in position by bending the arms of the forks around them, as shown at Fig. 3. By reason of this construction of the cage it can be easily introduced after the insertion of the balls in the bearing. It is merely necessary previously to arrange the balls at an equal distance from each other and to so distribute them that those of the one row or set are arranged intermediate of those of the other row or set when the cage can be pushed in from the side so that the balls of the one row engage in the recesses $d^1$ and the balls of the other row in the forks $d^2$.

What I claim as my invention and desire to secure by patent is:

1. A cage for ball bearings adapted to engage two or more rows of balls, said cage comprising a circular body having curved recesses adapted to receive the balls of one row and forks or lugs arranged in staggered relation to said recesses and connected to said body between the same, said forks or lugs being adapted to receive the balls of another row.

2. A cage for ball bearings adapted to engage two or more rows of balls, said cage comprising a circular body having curved recesses adapted to receive the balls of one row and forks or lugs arranged in staggered relation to said recesses, and pliable clips connecting said forks or lugs to the parts of said body between said recesses, said forks or lugs being adapted to engage an adjacent series of balls.

3. A ball bearing comprising two rings having ball races arranged so closely together that the balls of one race overlap the balls of the other race, and a cage for separating said balls and holding them in staggered relation, said cage comprising a circular body having recesses for receiving one set of balls and between said recesses forks or lugs connected to said body and adapted to receive the other set of balls.

4. A ball bearing comprising two rings having ball races arranged so closely together that the balls of one race overlap the balls of the other race and a cage for separating said balls and holding them in staggered relation, said cage comprising a circular body having recesses for receiving one set of balls and between said recesses forks or lugs connected to said body by pliable clips engaging the portions of said body between said recesses, and said forks or lugs being adapted to receive the other set of balls.

In witness whereof I have hereunto signed my name in the presence of two subscribing witnesses.

WILHELM SONNBERG.

Witnesses:
 ROBERT MICHALSKI,
 HENRY HASPER.